US011911849B2

(12) United States Patent
Nakano

(10) Patent No.: US 11,911,849 B2
(45) Date of Patent: Feb. 27, 2024

(54) LASER PEENING PROCESSING APPARATUS AND LASER PEENING PROCESSING METHOD

(71) Applicant: SUBARU CORPORATION, Tokyo (JP)

(72) Inventor: Mayu Nakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 213 days.

(21) Appl. No.: 16/513,467

(22) Filed: Jul. 16, 2019

(65) Prior Publication Data
US 2019/0337095 A1    Nov. 7, 2019

Related U.S. Application Data

(63) Continuation of application No. PCT/JP2017/039459, filed on Oct. 31, 2017.

(30) Foreign Application Priority Data

Jan. 23, 2017 (JP) .................. 2017-009877

(51) Int. Cl.
*B23K 26/356* (2014.01)
*B23K 26/146* (2014.01)
(Continued)

(52) U.S. Cl.
CPC .......... *B23K 26/356* (2015.10); *B23K 26/146* (2015.10); *B23K 26/1476* (2013.01); *C21D 10/005* (2013.01); *B23K 26/0006* (2013.01)

(58) Field of Classification Search
CPC .. C21D 10/005; B23K 26/356; B23K 26/146; B23K 26/0069; B23K 26/34;
(Continued)

(56) References Cited

U.S. PATENT DOCUMENTS 5,609,781 A * 3/1997 Kaga .................... B23K 26/032
219/121.67
8,581,141 B2 * 11/2013 Muratsubaki ........ B23K 26/146
219/121.84
(Continued)

FOREIGN PATENT DOCUMENTS

CA        2330426 C  * 11/2007  .......... B23K 26/032
JP    H 06-047672 A    2/1994
(Continued)

OTHER PUBLICATIONS

Chinese Office Action, dated Dec. 18, 2020, in Chinese Application No. 201780083149.2 and English Translation thereof.
(Continued)

*Primary Examiner* — Dana Ross
*Assistant Examiner* — Chris Q Liu
(74) *Attorney, Agent, or Firm* — MCGINN IP LAW GROUP, PLLC

(57) ABSTRACT

According to one implementation, a laser peening processing apparatus includes: a laser oscillator; and a nozzle. The laser oscillator oscillates a laser light. The nozzle focuses the laser light and irradiates a surface to be processed of a workpiece with the focused laser light while flowing a liquid toward the surface to be processed. A straightening part that straightens a flow of the liquid is disposed on the nozzle. Furthermore, according to one implementation, a laser peening processing method includes: oscillating a laser light; manufacturing a product or a semi-product by focusing the laser light and irradiating a surface to be processed of a workpiece with the focused laser light toward while flowing a liquid on the surface; and straightening the liquid using a straightening structure.

13 Claims, 8 Drawing Sheets

(51) Int. Cl.
*B23K 26/14* (2014.01)
*C21D 10/00* (2006.01)
*B23K 26/00* (2014.01)

(58) Field of Classification Search
CPC ........... B23K 26/1476; B23K 26/0006; B23K 37/06; B23K 26/702; B23K 26/1462; B23K 26/144; B23K 26/142; B23K 26/0869; B23K 26/04; B23K 26/342
USPC ...... 219/121.84, 121.63, 121.66, 121.71, 74, 219/121.12, 121.64, 121.72, 76.14, 219/121.14, 121.15, 121.17, 121.6
See application file for complete search history.

(56) References Cited

U.S. PATENT DOCUMENTS

| | | | | |
|---|---|---|---|---|
| 2007/0119837 | A1* | 5/2007 | Nishiya | B23K 26/146 219/121.84 |
| 2007/0193990 | A1* | 8/2007 | Richerzhagen | B23K 26/146 219/121.84 |
| 2009/0045177 | A1* | 2/2009 | Koseki | B23K 26/38 219/121.67 |
| 2012/0074105 | A1 | 3/2012 | Okamoto et al. | |
| 2012/0298649 | A1* | 11/2012 | Nagata | B23K 26/16 219/243 |
| 2013/0015168 | A1* | 1/2013 | Nagahori | B23K 26/14 219/121.72 |
| 2016/0333433 | A1* | 11/2016 | Petrosky | B23K 26/356 |
| 2017/0087667 | A1* | 3/2017 | Yamamoto | B23K 26/03 |
| 2018/0161928 | A1* | 6/2018 | Hu | B23K 26/1494 |
| 2018/0281109 | A1* | 10/2018 | Onodera | B23K 26/705 |
| 2019/0255651 | A1* | 8/2019 | Anderegg | B23K 26/146 |

FOREIGN PATENT DOCUMENTS

| | | |
|---|---|---|
| JP | 2006-137998 A | 6/2006 |
| JP | 2007-222897 A | 9/2007 |
| JP | 2008-049367 A | 3/2008 |
| JP | 2008-238260 A | 10/2008 |
| JP | 2013-006212 A | 1/2013 |
| JP | 2013-215786 A | 10/2013 |
| JP | 2016-132015 A | 7/2016 |

OTHER PUBLICATIONS

Notification of Transmittal of Translation of the International Preliminary Report on Patentability (PCT/IB/338), in PCT/JP2017/039459, dated Aug. 1, 2019.
International Preliminary Report on Patentability (IPRP) (PCT Form PCT/IB/373), in PCT/JP2017/039459, dated Jul. 23, 2019.
Translation of Written Opinion of the International Searching Authority (PCT/ISA/237), in PCT/JP2017/039459, dated Jan. 16, 2018.
Extended European Search Report dated Oct. 1, 2020 in European Patent Application No. 17 89 2788.5.
International Search Report (ISR) (PCT Form PCT/ISA/2010), in PCT/JP2017/39459, dated Jan. 16, 2018.
Japanese Office Action, dated Jun. 24, 2020, in Japanese Application No. 2018-562884 and English Translation thereof.

* cited by examiner

LASER PEENING PROCESSING APPARATUS AND LASER PEENING PROCESSING METHOD

CROSS REFERENCES TO RELATED APPLICATIONS

This is a continuation of Application PCT/JP2017/39459, filed on Oct. 31, 2017.

This application is based upon and claims the benefit of priority from Japanese Patent Application No. 2017-009877 filed on Jan. 23, 2017; the entire contents of which are incorporated herein by reference.

FIELD

Implementations described herein relate generally to a laser peening processing apparatus and a laser peening processing.

BACKGROUND

Conventionally, laser peening processing is known as a method of modifying property of a surface of an object by giving residual stress on the surface of the object (for example, refer to Japanese Patent Application Publication JP2008-238260 A, Japanese Patent Application Publication JP 2006-137998 A and Japanese Patent Application Publication JP 2008-049367 A). Laser peening processing is performed by irradiating a surface to be processed of a workpiece with a focused laser beam in a state where the surface to be processed is covered with liquid. When a focused laser beam is radiated on a surface to be processed of a workpiece covered with liquid, plasma which is generated by the irradiation of the laser beam can be confined in the liquid. As a result, pressure of a shock wave is applied to the surface to be processed. Thereby, compression stress generated inside the workpiece can be made to remain as residual stress.

It is important to suppress generating of air bubbles in liquid in laser peening processing. This is because energy of a laser beam which reaches a surface to be processed is attenuated due to air bubbles. Thus, a technique which prepares a valve on a pipe for supplying liquid for laser peening in order to remove air bubbles from the liquid by the valve has been suggested. Moreover, a technique to control a flow speed and a flow rate of liquid so that generation of air bubbles due to a cavitation can be inhibited has also been proposed.

However, disturbance in a flow of liquid which has been injected from a nozzle towards a surface to be processed causes air to be involved in the flow of the liquid and generating air bubbles. When air bubbles are generated in an optical path of laser, a laser light irregularly reflects on the air bubbles and the sufficient irradiation energy of laser may not be obtained. That is, there is a problem that an optical path of a laser beam is interrupted due to air bubbles and the energy of the laser beam is attenuated. In this case, laser peening processing cannot be performed with the strictly set energy of a laser beam. As a result, the sufficient effect by laser peening cannot be sometimes given to a part to be processed.

Accordingly, an object of the present invention is to reduce attenuation in energy of a laser beam due to air bubbles in laser peening processing.

SUMMARY OF THE INVENTION

In general, according to one implementation, a laser peening processing apparatus includes: a laser oscillator; and a nozzle. The laser oscillator oscillates a laser light. The nozzle focuses the laser light and irradiates a surface to be processed of a workpiece with the focused laser light while making a liquid flow toward the surface to be processed. A straightening part that straightens a flow of the liquid is disposed on the nozzle.

Further, according to one implementation, a laser peening processing method includes: oscillating a laser light; manufacturing a product or a semi-product by focusing the laser light and irradiating a surface to be processed of a workpiece with the focused laser light while making a liquid flow on the surface; and straightening the liquid using a straightening structure.

DETAILED DESCRIPTION

A laser peening processing apparatus and a laser peening processing method according to implementations of the present invention will be described with reference to the accompanying drawings.

(First Implementation)
(Structure and Function)

Figure 1:
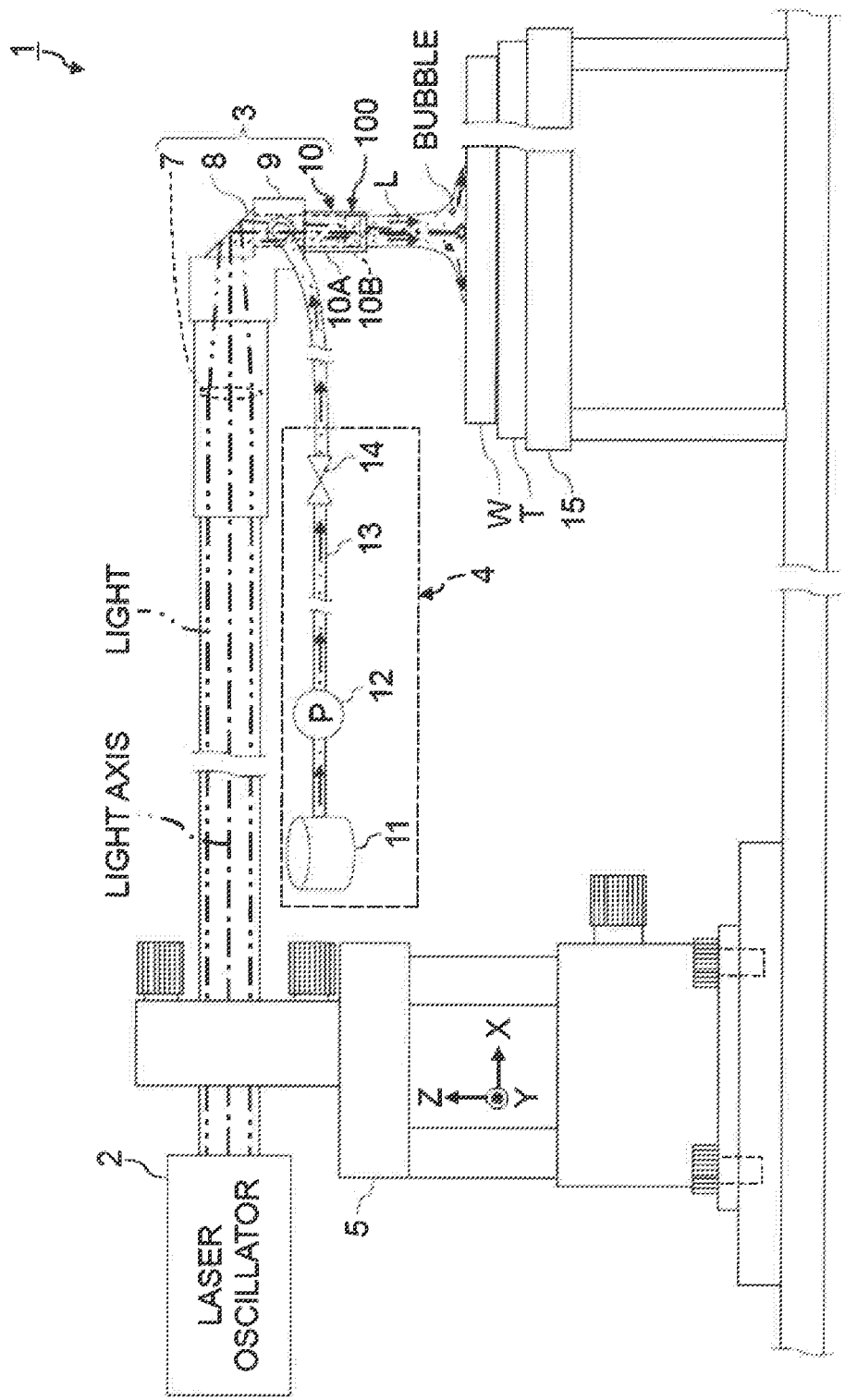
FIG. 1 is a view showing a structure of a laser peening processing apparatus according to the first implementation of the present invention.

FIG. 1 is a view showing a structure of a laser peening processing apparatus according to the first implementation of the present invention.

A laser peening processing apparatus 1 performs laser peening processing to a surface to be processed of a workpiece W made of a metal or the like, by emitting a laser beam toward the surface while making a desired liquid L flow, such as water, on the surface. Laser peening processing is to apply pressure of a shock wave to a surface to be processed of the workpiece W by irradiating the surface to be processed of the workpiece W with a focused laser beam in a state where the liquid L is attached on the surface to be processed of the workpiece W. Laser peening processing makes it possible to apply compressive residual stress on a surface to be processed of the workpiece W, as reaction force, by a pressure of a shock wave. When compressive residual stress is applied to a surface to be processed of the workpiece W, the formed compressive residual stress can restrain generation of a crack on the surface to be processed. Thereby, fatigue characteristics of the workpiece W can be improved.

The laser peening processing apparatus 1 can be composed of a laser oscillator 2, a nozzle 3, a liquid supply system 4 and a moving structure 5 as exemplified in FIG. 1.

The laser oscillator 2 is a device which oscillates a laser light so as to irradiate the nozzle 3 with the oscillated laser light. A desired optical system, such as a noise filter, can be prepared between the laser oscillator 2 and the nozzle 3. Typical examples of laser light for laser peening processing include YAG pulse laser light.

The nozzle 3 is configured to condense a laser light and emit the laser light toward a surface to be processed of the workpiece W, with making the liquid L flow, for laser peening processing, toward the surface to be processed. The nozzle 3 can be composed of a condensing lens 7, an optical element 8, and a liquid tank 9.

The condensing lens 7 is an optical element for entering and condensing a laser light emitted from the laser oscillator 2. Therefore, the condensing lens 7 is disposed so as to be on the laser light axis inside a cylindrical structure for covering a laser light emitted from the laser oscillator 2.

The nozzle 3 can include the optical element 8 besides the condensing lens 7. The optical element 8 changes an advance direction of a laser light, which transmitted the condensing lens 7, in order to irradiate a surface to be processed of the workpiece W with the laser light. Disposing the optical element 8 which changes an advance direction of a laser light makes it possible to radiate the laser light in a desired direction.

In the example shown in the figure, a prism which bends the light axis at a right angle is disposed as the optical element 8. A prism is a polyhedron made of a transparent medium, such as glass or crystal, having a refractive index which is different from each refractive index in a light incidence side and a light output side. As a matter of course, a mirror may be used instead of a prism. Alternatively, an advance direction of laser light may be changed using an optical fiber.

The liquid tank 9 is a container for temporarily reserving and pouring the liquid L for laser peening processing of the workpiece W. The liquid tank 9 has a supply port and an outflow port of the liquid L so that the liquid L supplied from the supply port can flow out to a surface to be processed of the workpiece W from the outflow port.

Moreover, the liquid tank 9 has an incident window so that a laser light which transmitted the incident window through the optical element 8 may be emitted in the same direction as an outflow direction of the liquid L. That is, the outflow port of the liquid L doubles as the exit of laser light, and a surface to be processed of the workpiece W is irradiated with the laser light from the outflow port of the liquid L.

Therefore, the laser light axis is approximately the same direction as the outflow direction of the liquid L. Specifically, the nozzle 3 is configured to perform irradiation with a laser light while pouring the liquid L in such a way that the outflow direction of the liquid L is same as the irradiation direction of the laser light. Accordingly, the incident window and the outflow port of the liquid tank 9 are disposed so that they may be on the optical axis of the laser light.

Moreover, disposing the optical elements 8, such as a prism, allows radiating the laser light while making the liquid L flow so that the outflow direction of the liquid L and the radiating direction of the laser light each becomes vertically downward. In this case, the liquid L can be injected by taking advantage of the gravity in addition to the liquid pressure. When the liquid L is made to flow out using the gravity, the liquid pressure for injecting the liquid L can be set low. In such a case, laser peening processing can be performed by making the liquids L, such as water, flow to a surface to be processed of the workpiece W with such a low pressure as about a pressure of a tap water.

Hereinafter, a case where the liquid pressure is used for injecting the liquid L from the nozzle 3 so that the liquid L flows out to a surface to be processed of the workpiece W will be explained. As a matter of course, the gravity may be mainly used for making the liquid L to flow out from the nozzle 3 to a surface to be processed of the workpiece W.

It is preferable to set a size of the outflow port of the liquid L larger than a beam diameter of the laser light. This is because a diameter of a flow of the liquid L becomes larger than a beam diameter of the laser light so that a surface to be processed of the workpiece W is irradiated with the laser light transmitting the inside of the liquid L. That is, it is preferable that the laser light is made to transmit the inside of a liquid column formed by a flow of the liquid L.

Therefore, it is important to form a stable flow of the liquid L in order to maintain the energy of laser light. Ideally, it is important to form a stable liquid column in which air bubbles do not exist on an optical path of the laser light. This is because the laser light irregularly reflects on possible air bubbles on an optical path of the laser light. In order to prevent the generation of air bubbles in the liquid L, it is effective to prevent air entrainment caused by turbulence of a flow of the liquid L. That is, it is important to stabilize a flow of the liquid L.

Thus, a straightening part 10 for straightening a flow of the liquid L is disposed on the end section 100 (e.g., see FIG. 1 and FIG. 3) of the nozzle 3. The straightening part 10 can be composed of at least one of a cylindrical structure 10A and a straightening vane 10B. In an example shown in FIG. 1, both of the cylindrical structure 10A and the straightening vane 10B are disposed on the end section 100 of the nozzle 3, as the straightening part 10.

Figure 2:
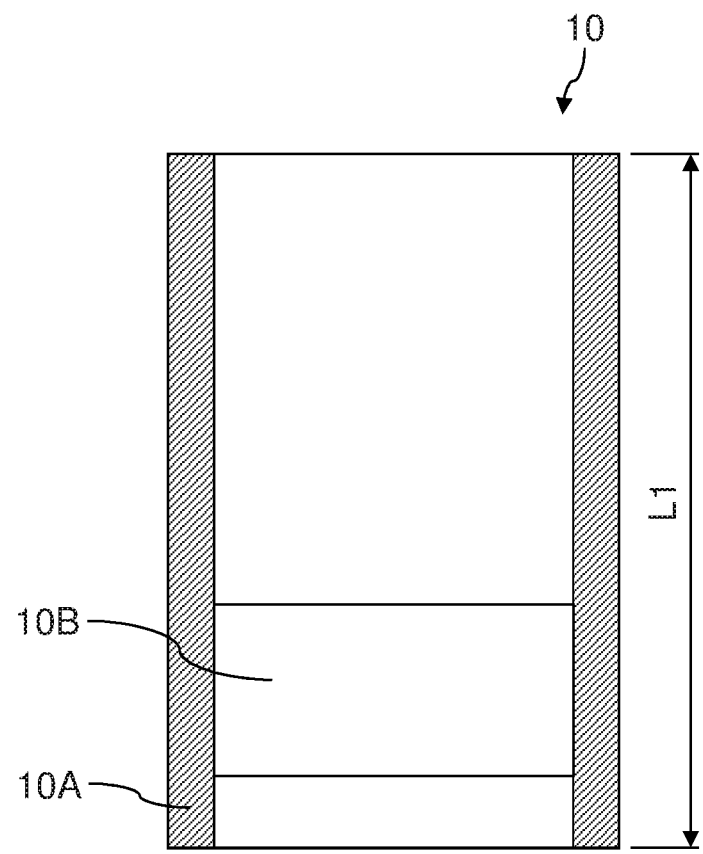
FIG. 2 is a partial longitudinal sectional view showing an example of the first detailed structure of the straightening part shown in FIG. 1.
Figure 3:
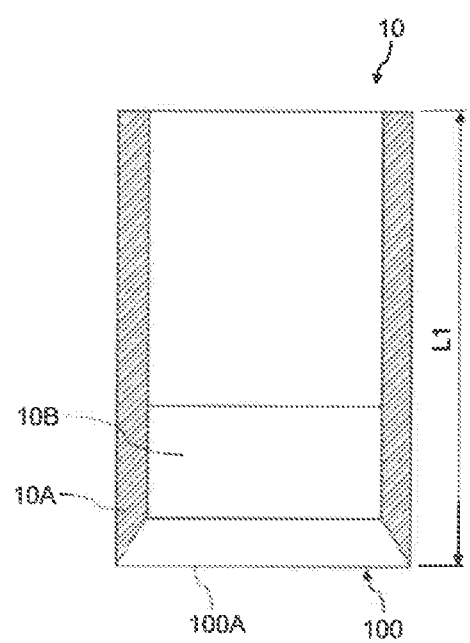
FIG. 3 is a partial longitudinal sectional view showing an example of the second detailed structure of the straightening part shown in FIG. 1.
Figure 4:
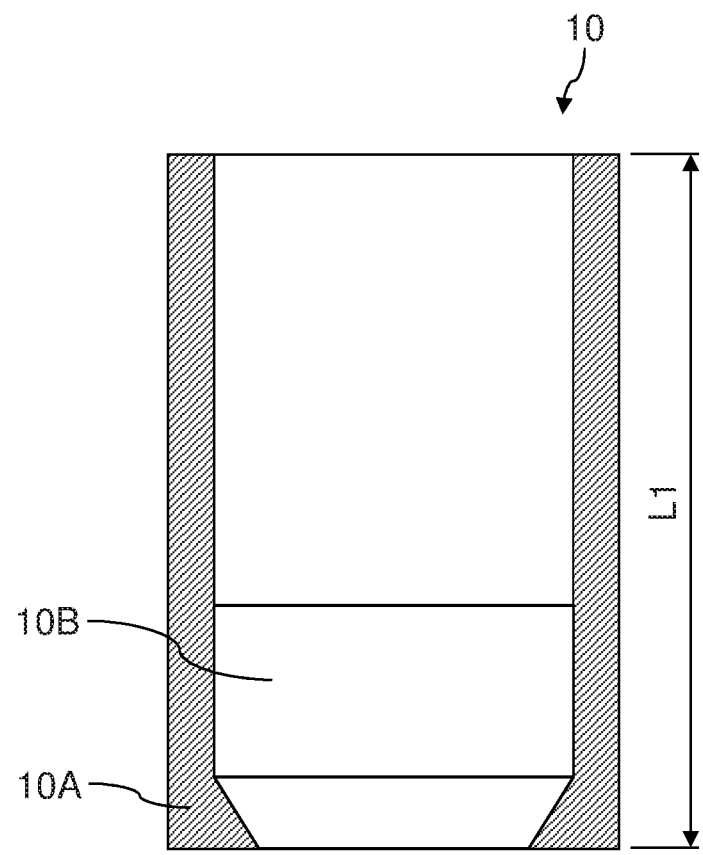
FIG. 4 is a partial longitudinal sectional view showing an example of the third detailed structure of the straightening part shown in FIG. 1.
Figure 5:
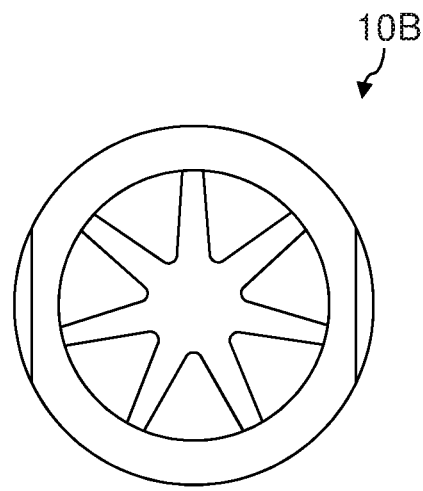
FIG. 5 is a bottom view of the straightening vane shown in FIG. 2 to FIG. 4.
Figure 6:
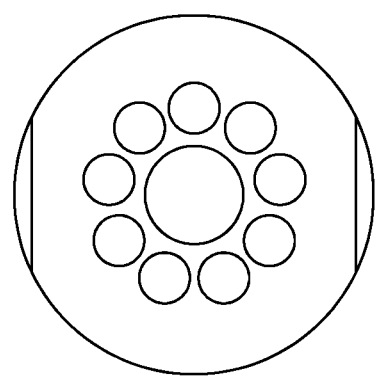
FIG. 6 is a bottom view of a comparative example with the straightening vane shown in FIG. 5.

FIG. 2 is a partial longitudinal sectional view showing an example of the first detailed structure of the straightening part 10 shown in FIG. 1. FIG. 3 is a partial longitudinal sectional view showing an example of the second detailed structure of the straightening part 10 shown in FIG. 1. FIG. 4 is a partial longitudinal sectional view showing an example of the third detailed structure of the straightening part 10 shown in FIG. 1. Moreover, FIG. 5 is a bottom view of the straightening vane 10B shown in FIG. 2 to FIG. 4. FIG. 6 is a bottom view of a comparative example with the straightening vane 10B shown in FIG. 5.

The cylindrical structures 10A as shown in FIG. 2 to FIG. 4 were experimentally produced and a verification test of a rectification effect of the liquid L were performed. Specifically, the cylindrical structure 10A having a constant inner diameter as shown in FIG. 2, the cylindrical structure 10A having a top tapered in the inner side so that the outlet of the liquid L might become larger gradually as shown in FIG. 3 and the cylindrical structure 10A having a top tapered in the inner side so that the outlet of the liquid L might become smaller gradually as shown in FIG. 4 were produced for tests respectively.

As a result, a satisfactory rectification effect of the liquid L have been confirmed, in particular, in a case of disposing the straightening vane 10B, of which a cross section of a gap for making the liquid L pass through had a star shape, on the end section 100 of the nozzle 3 as shown in FIG. 5, and in a case of forming a tapered part inside the end section 100 of the nozzle 3, which forms a fluid channel of the liquid L having a circular cross section, so that the diameter of the fluid channel may become larger gradually toward the tip 100A of the nozzle 3 as shown in FIG. 3.

The liquid supply system 4 supplies the liquid L, for laser peening processing, to the liquid tank 9 of the nozzle 3. The liquid supply system 4 can be composed of a tank 11 which reserves the liquid L for laser peening processing, a pump 12, and a pipe 13. The pipe 13 may have an on-off valve 14 as necessary.

The pipe 13 forms a fluid channel of the liquid L between the tank 11 and the liquid tank 9. The pump 12 and the on-off valve 14 are disposed on the pipe 13. Therefore, the liquid L in the tank 11 can be supplied to the liquid tank 9 by operating the pump 12. Moreover, a liquid pressure can be adjusted by opening and closing the on-off valve 14. Therefore, the on-off valve 14 takes a role of a pressure control mechanism which controls a pressure of the liquid L injected towards a surface to be processed of the workpiece W.

The moving structure 5 is a device which slides at least one of the nozzle 3 and the workpiece W relative to the other. That is, the moving structure 5 has a function to move the nozzle 3 relatively to the workpiece W. For example, the moving structure 5 can be composed of a three-axis slide mechanism which can move the nozzle 3 in parallel in three axes directions consisting of an X-axis, a Y-axis and a Z-axis mutually intersecting perpendicularly. As a matter of course, the moving structure 5 can be composed of a tilting structure and/or a rotating structure. Driving the moving structure 5 allows continuous laser peening processing while changing a point to be processed.

(Operation and Action)

Next, a laser peening processing method using the laser peening processing apparatus 1 will be described.

Firstly, the workpiece W is fixed to a jig T set on the table 15. Alternatively, the workpiece W is directly fixed to the table 15. Then, positioning of the workpiece W is performed by driving the moving structure 5 so that a focus of the laser light radiated from the nozzle 3 may be a starting position of laser peening processing on a surface to be processed of the workpiece W.

Next, the laser oscillator 2 oscillates the laser light. That is, the laser light is emitted from the laser oscillator 2. The emitted laser light enters the condensing lens 7 in the nozzle 3 through a desired optical system. The laser light which entered the condensing lens 7 transmits the condensing lens 7 while being condensed. The laser light which transmitted the condensing lens 7 enters the optical element 8. The advance direction of the laser light which entered the optical element 8 is changed vertically downward in the optical element 8 and the laser light of which advance direction was changed is output from the optical element 8.

Meanwhile, the pump 12 of the liquid supply system 4 operates. Thereby the liquid L for laser peening processing in the tank 11 is supplied to the liquid tank 9 through the pipe 13. As a result, the liquid L is made to flow out from an opening formed below the liquid tank 9 toward the surface to be processed of the workpiece W. Therefore, the laser light output from the optical element 8 transmits the liquid L while being condensed so that the surface to be processed of the workpiece W is irradiated. That is, the nozzle 3 condenses and radiates the laser light while making the liquid L flow towards the surface to be processed of the workpiece W.

Consequently, plasma generates on the surface to be processed of the workpiece W. Thereby, pressure of a shock wave is applied to the surface to be processed of the workpiece W. Then, strength of the processed surface can be increased by residual stress.

At this time, the liquid L is rectified in the straightening part 10 when flowing out from the nozzle 3. Therefore, air entrainment caused by disorder in a flow of the liquid L is prevented, and the amount of air bubbles which may be generated in the liquid L can be reduced sufficiently.

Therefore, the laser light is not cut off with many air bubbles so that the surface to be processed of the workpiece W can be irradiated with the laser light. In other words, the surface to be processed of the workpiece W is irradiated with the laser light having a sufficient energy density. As a result, improvement in strength of the processed surface can be ensured.

When the surface to be processed of the workpiece W is large, the laser peening processing can be performed subsequently while relatively moving the workpiece W by driving the moving structure 5. After the laser peening processing of the entire surface to be processed is completed, a processed product can be obtained. That is, a product or a semi-product to which the laser peening processing has been applied can be produced.

As described above, the laser peening processing apparatus 1 and the laser peening processing method are to have the straightening part 10 for straightening a flow of the liquid L at an end section 100 of the nozzle 3 in order to prevent generating of air bubbles caused by disorder of the flow of the liquid L.

(Effects)

Therefore, according to the laser peening processing apparatus 1 and the laser peening processing method, the liquid L can be made to smoothly flow out from a tip of the nozzle 3. Consequently, a stable liquid column can be formed so that generating of air bubbles, caused by entrainment of the air, causing a diffused reflection of the laser light can be prevented. As a result, attenuation of energy of a laser beam due to air bubbles can be reduced. In other words, laser peening processing can be performed under a more preferable condition.

(Second Implementation)

Figure 7:
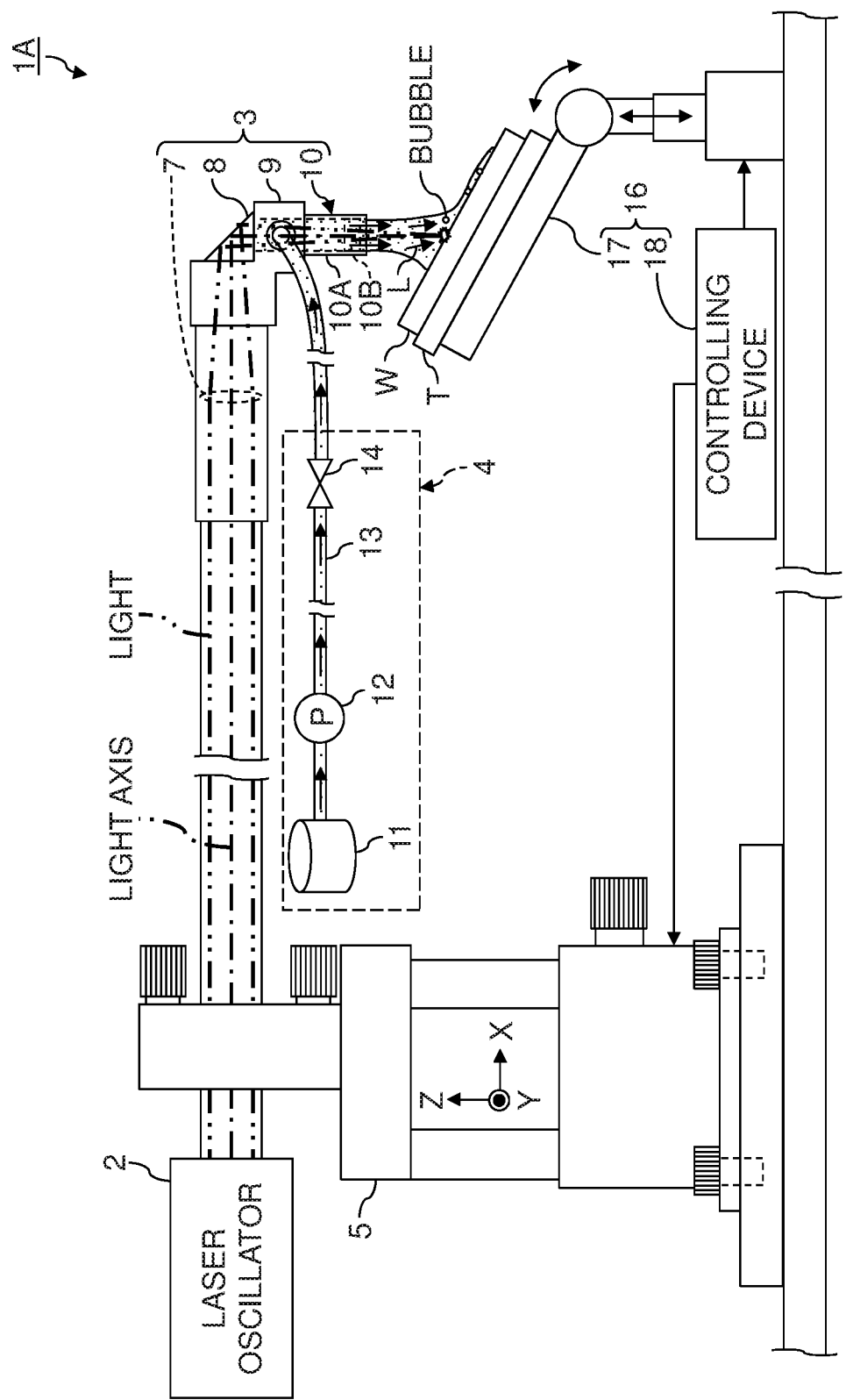
FIG. 7 is a view showing a structure of a laser peening processing apparatus according to the second implementation of the present invention.

FIG. 7 is a view showing a structure of a laser peening processing apparatus according to the second implementation of the present invention.

A laser peening processing apparatus 1A in the second implementation shown in FIG. 7 is different from the laser peening processing apparatus 1 in the first implementation in the point that a tilting structure 16 is disposed for tilting the workpiece W. Other configurations and actions of the laser peening processing apparatus 1A in the second implementation are not substantially different from those of the laser peening processing apparatus 1 in the first implementation. Therefore, the same signs are attached with the same elements or the corresponding elements, and explanation thereof will be omitted.

The tilting structure 16 tilts the workpiece W so that the outflow direction of the liquid L for laser peening processing may become different from a normal direction of the surface to be processed of the workpiece W. Specifically, the tilting structure 16 is a device which tilts the workpiece W so that the liquid L may not be injected at right angle to the surface to be processed of the workpiece W, while keeping the distance between each laser peening processing position and the nozzle 3 constant so that a focal point of the laser light may lie on the laser peening processing position on the surface to be processed of the workpiece W.

When laser peening processing is performed, air bubbles are also generated from the surface to be processed of the workpiece W which has been irradiated with the laser light, due to an collision of the surface to be processed with the liquid L and a shock of the irradiation to the surface to be processed of the workpiece W with the laser light. When air bubbles are accumulated in the liquid L for laser peening processing, an optical path of the laser light is interrupted, which might cause scattering or attenuation of the laser light. Therefore, it is important to remove air bubbles out of the liquid L for laser peening processing in order to apply a sufficient pressure of a shock wave on the surface to be processed in laser peening processing.

As a result of observing laser peening processing, it became clear that air bubbles generated by irradiation with the laser light tended to accumulate in stagnation in which a flow of the liquid L is stagnant. Therefore, reducing stagnation in each irradiation area with the laser light makes it possible to avoid that air bubbles locally remain in each irradiation area with the laser light.

Figure 8:
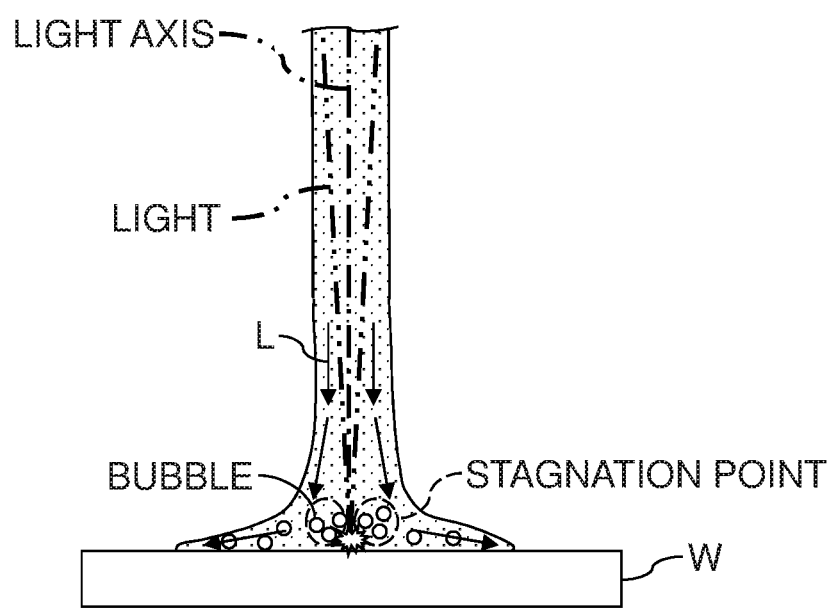
FIG. 8 shows the conventional laser peening processing method.

FIG. 8 shows a situation of stagnation generated by the conventional laser peening processing method.

When the liquid L for laser peening processing is injected perpendicularly to the surface to be processed of the workpiece W as shown in FIG. 8, stagnation of the liquid L is generated around a spot, on the surface to be processed, irradiated with the laser light. Therefore, air bubbles generated by irradiation with the laser light are to remain around the irradiated spot. As a result, the optical path of the laser light is interrupted with air bubbles, which leads to scattering or attenuation of the laser light.

Thus, the workpiece W can be tilted using the tilting structure 16 as shown in FIG. 7 so that it can be avoided that stagnation generated in the liquid L concentrates near an area irradiated with the laser light. Specifically, slanting the workpiece W makes the liquid L to flow obliquely downward, i.e., a flow of the liquid L is formed. As a result, a generation amount of stagnation in the liquid L can be reduced. Moreover, even when stagnation arises, the stagnation also flows obliquely downward, from an irradiation area with the laser light, along a flow of the liquid L. As a result, air bubbles caused by an collision of the liquid L with the surface to be processed of the workpiece W and a shock due to irradiation of the surface to be processed with the laser light can be made to flow obliquely downward with the liquid L without remaining in the stagnation.

Although the outflow direction of the liquid L and the outputting direction of the laser light are vertically downward in an example shown in FIG. 7, each of the outflow direction of the liquid L and the outputting direction of the laser light may be different from vertically downward, depending on a structure of the workpiece W. Even in such a case, the workpiece W can be tilted by the tilting structure 16 so that the outflow direction of the liquid L may become different from the normal direction of the surface to be processed of the workpiece W. Thereby, the liquid L can be made to flow to a specific direction corresponding to a tilt direction of the surface to be processed relative to the outflow direction of the liquid L. Therefore, air bubbles generated in laser peening processing can be made to flow along with the liquid L toward a direction corresponding to a tilt direction of the surface to be processed relative to the outflow direction of the liquid L.

The tilting structure 16 can be composed of a robot arm 17 and a controlling device 18, for example. The robot arm 17 can variably control a tilt angle of the surface to be processed of the workpiece W, to the outflow direction of the liquid L for laser peening processing, while keeping a focus of the laser light on the surface to be processed of the workpiece W. The controlling device 18 controls the robot arm 17. The robot arm 17 can be composed of a required number of rotating structures and telescopic structures. The robot arm 17 may be composed using a plurality of rotating structures so that tilt angles in two directions can be adjusted. Meanwhile, the controlling device 18 which controls the robot arm 17 can be composed using electronic circuitry, such as a computer.

In an example shown in FIG. 7, the workpiece W is fixed to the jig T while the jig T is held by the robot arm 17. As a matter of course, the workpiece W may be held directly by the robot arm 17. That is, the tilting structure 16 can be composed of the robot arm 17 which holds the workpiece W or the jig T for attaching the workpiece W.

Moreover, the tilting structure 16 may be composed of not only the robot arm 17 but also a tilting device having a rotary shaft possible to tilt the workpiece W or the jig T for attaching the workpiece W. In that case, a control device for controlling the tilting device is installed.

The surface to be processed of the workpiece W is not necessarily flat. For example, when the workpiece W is an aircraft part, the surface to be processed may have concavity and convexity and/or the surface to be processed may be a curved surface. Therefore, when laser peening processing is performed while changing a relative position of the nozzle 3 to the workpiece W by driving the moving structure 5, the angle formed between the outflow direction of the liquid L and the normal direction of the surface to be processed may change. Thus, the workpiece W can be inclined so that the inclined angle of the surface to be processed to the outflow direction of the liquid L becomes constant or within a predetermined range during sliding at least one of the nozzle 3 and the workpiece W, based on three-dimensional information showing a shape of the surface to be processed.

When laser peening processing is performed while changing the inclined angle of the surface to be processed of the workpiece W, a parallel translation of the workpiece W is necessary in addition to a rotation movement of the workpiece W in order to keep a focus of the laser light on the surface to be processed of the workpiece W, unless a rotating axis of the workpiece W overlaps a laser peening processing position. For example, when the inclined angle of the workpiece W is changed by the robot arm 17 as shown in FIG. 7, it is necessary to move the workpiece W in parallel in the vertical direction. Thus, the robot arm 17 can have a plurality of rotating shafts, or the robot arm 17 can have an expansion and contraction structure which is composed of a cylinder structure or the like so that the workpiece W can be moved in parallel.

Furthermore, a parallel translation of the nozzle 3 by the moving structure 5 may be performed in conjunction with a rotation movement of the workpiece W. In that case, the moving structure 5 can also be controlled by the controlling device 18, based on the three-dimensional information showing a shape of the surface to be processed. Therefore, it can also be said that the moving structure 5 functions as a part of the tilting structure 16.

The three-dimensional information showing a shape of the surface to be processed can be previously stored in a storage which is provided in the controlling device 18. Then, an inclined angle of the surface to be processed to the outflow direction of the liquid L can be kept so that the inclined angle becomes constant or within a predetermined range, by the robot arm 17 under the control of the controlling device 18 referring to the three-dimensional information of the surface to be processed. In addition, at least one of the robot arm 17 and the moving structure 5 can be controlled by the controlling device 18 referring to the three-dimensional information of the surface to be processed so that a focus of the laser light becomes on the surface to be processed.

The amount of stagnation of the liquid L caused by collision between the liquid L and the surface to be processed also changes depending on a liquid pressure of the liquid L. Thus, the pressure of the liquid L can be controlled by the valve 14 as the pressure control mechanism, which controls the pressure of the liquid L, so as to reduce the stagnation. Specifically, the generation amount of the stagnation can be reduced by adjusting the opening of the valve 14. The appropriate opening of the valve 14 for reducing the stagnation can be obtained empirically by tests.

Note that, as long as the pressure of the liquid L can be controlled, a device other than the valve 14 can be used as the pressure control mechanism. In that case, the pressure of the liquid L can also be controlled by the pressure control mechanism so as to reduce the generation amount of the stagnation.

As described above, the laser peening processing apparatus 1A in the second implementation can avoid not only generation of air bubbles resulting from disorder of a flow of the liquid L but also stay of air bubbles in stagnation near an area irradiated with the laser light by adjusting a liquid pressure of the liquid L and a tilt angle of the surface to be processed. Therefore, attenuation of the laser light caused by existence of air bubbles can be further reduced by the laser peening processing apparatus 1A in the second implementation.

(Modification of the Second Implementation)

Figure 9:
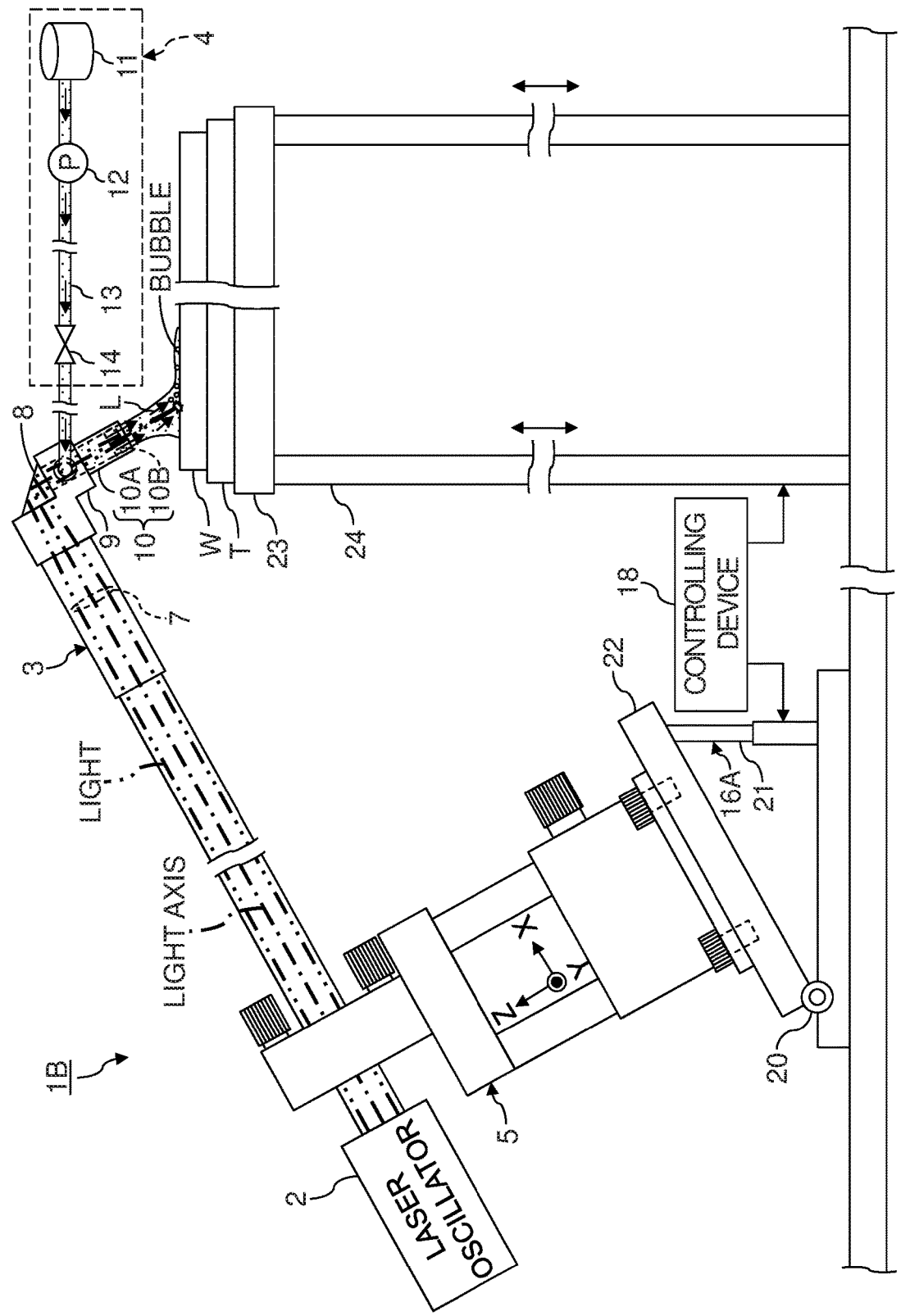
FIG. 9 is a view showing a structure of a modification of the laser peening processing apparatus in the second implementation shown in FIG. 7.

FIG. 9 is a view showing a structure of a modification of the laser peening processing apparatus in the second implementation shown in FIG. 7.

A tilting structure 16A of a laser peening processing apparatus 1B shown in FIG. 9 is coupled to the nozzle 3. Therefore, an inclined angle of the nozzle 3 to the surface to be processed of the workpiece W can be variably controlled. For example, the tilting structure 16A can be composed using a rotating shaft 20 and cylinder structures 21 which extend and contract, as shown in FIG. 9. Specifically, the tilting structure 16A which can variably control an inclined angle of the nozzle 3 can be composed of the cylinder structures 21, each extending and contracting, which support one end of the lower part of a table 22 which also serves as a part of the moving structure 5, and the rotating shaft 20 which rotatably supports the other end of the table 22. Therefore, the tilting structure 16A may also be an element of the moving structure 5.

On the other hand, a height adjusting structure 24 can be disposed. The height adjusting structure 24 adjusts a height of a table 23 for placing the workpiece W or the jig T for the workpiece W so that a focus of the laser light becomes a laser peening processing position on the surface to be processed of the workpiece W. The height adjusting structure 24 can be controlled by the controlling device 18. Therefore, it can be said that the height adjusting structure 24 also composes a part of the tilting structure 16A which inclines the workpiece W so that the liquid L is not injected perpendicularly to the surface to be processed of the workpiece W, with keeping a distance between each laser peening processing position and the nozzle 3 constant. The height adjusting structure 24 can be composed using cylinder structures, ball screws, or the like. As a matter of course, a height of the nozzle 3 may be adjusted by the moving structure 5, instead of adjusting the height of the table 23 for placing the jig T for the workpiece W. Alternatively, both heights of the table 23 and the nozzle 3 may be adjusted.

As shown in FIG. 9, the nozzle 3 may be tilted instead of tilting the workpiece W. In this case, when the workpiece W is large-sized or a weight of the workpiece W is large especially, a large scale device can be made unnecessary since the inclination of the workpiece W can be made unnecessary.

On the contrary, when the workpiece W has a small size or a weight of the workpiece W is small, the outflow direction of the liquid L can constantly be vertically downward by inclining the workpiece W side as shown in FIG. 7. Thereby, the liquid L can be made to flow out using the gravity. In addition, a large scale device for the inclination of the nozzle 3 and the moving structure 5 can be made unnecessary.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, both of the tilt angles of the nozzle 3 and the workpiece W may be controlled in the second implementation. Therefore, a tilting structure can be adapted to tilt at least one of the nozzle 3 and the workpiece W.

What is claimed is:

1. A laser peening processing apparatus comprising:
a laser oscillator configured to oscillate a laser light; and
a nozzle including a straightening part disposed at a distal end of the nozzle and configured to straighten a flow of a liquid, the nozzle being configured to:
focus the laser light passing through the nozzle and irradiate a surface to be processed of a workpiece with the focused laser light while making the liquid passing through the nozzle flow toward the surface to be processed; and
eject the liquid from the distal end of the nozzle toward the surface to be processed,
wherein the straightening part includes:
a straightening vane that is configured to pass liquid and the laser light through a gap thereof; and
a cylindrical structure disposed:
at a distal end of the nozzle; and
adjacent to and in communication with the straightening vane such that a hollow flow path of the cylindrical structure receives the flow of the liquid directly from the gap of straightening vane,
wherein the gap of straightening vane has a cross section with a heptagram star shape in a flow direction of the liquid,
wherein the hollow flow path of the cylindrical structure of the straightening part has a circular cross section different than the heptagram star shape of the straightening vane,
wherein a diameter of the hollow flow path of the cylindrical structure of the straightening part becomes gradually larger toward the distal end of the nozzle, and
wherein a width of the hollow flow path of the cylindrical structure of the straightening part at the distal end of the nozzle is greater than a width of the gap of straightening vane at a distal end of the gap of straightening vane.

2. A laser peening processing apparatus according to claim 1, wherein the nozzle is configured to irradiate the laser light in an irradiation direction of the laser light and make the liquid flow in an outflow direction of the liquid that is a same direction as the irradiation direction of the laser light.

3. A laser peening processing apparatus according to claim 2, further comprising:
a valve configured to control a pressure of the liquid injected towards the surface, to be processed, of the workpiece.

4. A laser peening processing apparatus according to claim 1, wherein the nozzle is configured to irradiate the laser light in an irradiation direction of the laser light and make the liquid flow in an outflow direction of the liquid and the outflow direction of the liquid and the irradiation direction of the laser light are vertically downward.

5. A laser peening processing apparatus according to claim 1, further comprising:
a valve configured to control a pressure of the flow of liquid injected towards the surface, to be processed, of the workpiece.

6. A laser peening processing apparatus according to claim 1, wherein the liquid ejects directly from the cylindrical structure without passing into an additional structure.

7. The laser peening processing apparatus according to claim 1,
wherein the star shape includes a center portion and tapered portions that radially extend from the center portion, ends of the tapered portions adjacent to the cylindrical structure have curved shapes, and
connecting portions between adjacent tapered portions of the tapered potions have curved shapes.

8. The laser peening processing apparatus according to claim 7, wherein the tapered potions include seven tapered portions.

9. A laser peening processing apparatus comprising:
a laser oscillator configured to oscillate a laser light; and
a nozzle including a straightening part disposed at a distal end of the nozzle and configured to straighten a flow of a liquid, the nozzle being configured to:
focus the laser light passing through the nozzle and irradiate a surface to be processed of a workpiece with the focused laser light while making the liquid passing through the nozzle flow toward the surface to be processed; and
eject the liquid from the distal end of the nozzle toward the surface to be processed,
wherein the straightening part includes:
a straightening vane that is configured to pass liquid and the laser light through a gap thereof; and
a cylindrical structure disposed:
at a distal end of the nozzle; and
adjacent to and in communication with the straightening vane such that a hollow flow path of the cylindrical structure receives the flow of the liquid directly from the gap of straightening vane,
wherein the gap of straightening vane has a cross section with a star shape in a flow direction of the liquid,
wherein the hollow flow path of the cylindrical structure of the straightening part has a circular cross section different than the star shape of the straightening vane,
wherein a diameter of the hollow flow path of the cylindrical structure of the straightening part becomes gradually larger toward the distal end of the nozzle, and
wherein a width of the hollow flow path of the cylindrical structure of the straightening part at the distal end of the nozzle is greater than a width of the gap of straightening vane at a distal end of the gap of straightening vane, and
wherein the star shape of the cross section of the gap of the straightening vane is heptagram star polygon.

10. A laser peening processing apparatus comprising:
a laser oscillator configured to oscillate a laser light; and
a nozzle including a straightening part disposed at a distal end of the nozzle and configured to straighten a flow of a liquid, the nozzle being configured to:
focus the laser light passing through the nozzle and irradiate a surface to be processed of a workpiece with the focused laser light while making the liquid passing through the nozzle flow toward the surface to be processed; and
eject the liquid from the distal end of the nozzle toward the surface to be processed,
wherein the straightening part includes:
a straightening vane that is configured to pass liquid and the laser light through a gap thereof; and
a cylindrical structure disposed:
at a distal end of the nozzle;
closer to the distal end of the nozzle than the straightening vane; and
adjacent to and in communication with the straightening vane such that a hollow flow path of the cylindrical structure receives the flow of the liquid directly from the gap of straightening vane,
wherein the gap of straightening vane has a cross section with a heptagram star shape in a flow direction of the liquid,
wherein the hollow flow path of the cylindrical structure of the straightening part has a circular cross section different than the heptagram star shape of the straightening vane,
wherein a diameter of the hollow flow path of the cylindrical structure of the straightening part becomes gradually larger toward the distal end of the nozzle, and
wherein a width of the hollow flow path of the cylindrical structure of the straightening part at the distal end of the nozzle is greater than a width of the gap of straightening vane at a distal end of the gap of straightening vane.

11. The laser peening processing apparatus according to claim 10,
wherein the heptagram star shape includes a center portion and tapered portions that radially extend from the center portion, ends of the tapered portions adjacent to the cylindrical structure have curved shapes, and
connecting portions between adjacent tapered portions of the tapered portions have curved shapes.

12. The laser peening processing apparatus according to claim 11, wherein the tapered potions include seven tapered portions.

13. A laser peening processing apparatus according to claim 1, further comprising: a tilting structure configured to tilt at least one of the nozzle and the workpiece so as to make an outflow direction of the liquid different from a normal direction of the surface, in order to flow bubbles and the liquid in a direction corresponding to a tilt direction of the surface relative to the outflow direction of the liquid, the bubbles being generated by at least one of a collision of the liquid with the surface and a shock due to an irradiation of the laser light toward the surface.

* * * * *